US012695789B2

(12) United States Patent
Bhattacharya et al.

(10) Patent No.: US 12,695,789 B2
(45) Date of Patent: Jul. 28, 2026

(54) SYSTEM AND METHOD TO CREATE ZERO TRUST FRAMEWORK FOR SECURITY AS A SERVICE

(71) Applicant: Skyhigh Security LLC, Plano, TX (US)

(72) Inventors: Anamika Bhattacharya, Bangalore (IN); Deepak Bharadwaj, Bangalore (IN); Sriranga Seetharamaiah, Bangalore (IN); Abhisek Sanyal, Bangalore (IN); Siddaraya Revashetti, Cupertino, CA (US)

(73) Assignee: Skyhigh Security LLC, Plano, TX (US)

( * ) Notice: Subject to any disclaimer, the term of this patent is extended or adjusted under 35 U.S.C. 154(b) by 313 days.

(21) Appl. No.: 17/720,647

(22) Filed: Apr. 14, 2022

(65) Prior Publication Data

US 2022/0337631 A1     Oct. 20, 2022

(30) Foreign Application Priority Data

Apr. 15, 2021    (IN) ............................ 202141017536

(51) Int. Cl.
*H04L 9/40* (2022.01)
*H04L 67/1008* (2022.01)
*H04L 67/1014* (2022.01)

(52) U.S. Cl.
CPC ............ *H04L 63/20* (2013.01); *H04L 63/102* (2013.01); *H04L 67/1008* (2013.01); *H04L 67/1014* (2013.01)

(58) Field of Classification Search
CPC ... H04L 63/20; H04L 63/102; H04L 67/1008; H04L 67/1014; H04L 63/105; H04L 63/1441; H04L 63/0245
See application file for complete search history.

(56) References Cited

U.S. PATENT DOCUMENTS

| | | | | |
|---|---|---|---|---|
| 9,973,525 B1 * | 5/2018 | Roturier | .............. | H04L 63/1433 |
| 10,154,007 B1 * | 12/2018 | Viswanathan | .......... | H04L 63/20 |
| 10,382,401 B1 * | 8/2019 | Lee | ........................ | H04L 63/166 |
| 11,170,099 B1 * | 11/2021 | Sandall | ................... | G06F 9/547 |
| 11,240,109 B2 * | 2/2022 | Andrews | ............. | H04L 41/0894 |
| 2015/0256341 A1 * | 9/2015 | Ye | ........................... | H04L 9/321 |
| | | | | 713/164 |
| 2018/0026893 A1 * | 1/2018 | Jeuk | .................... | H04L 47/2475 |
| | | | | 370/236 |
| 2019/0273746 A1 * | 9/2019 | Coffing | .................. | G06Q 20/40 |
| 2022/0141254 A1 * | 5/2022 | Oswal | ................... | H04L 63/101 |
| | | | | 726/1 |

* cited by examiner

*Primary Examiner* — Ali S Abyaneh
(74) *Attorney, Agent, or Firm* — Byrne Poh LLP

(57) ABSTRACT

An apparatus includes a network interface that performs a reception of a launch request and receives a policy for a service. The launch request includes an identifier of a workload and an identifier of an application. A processor determines a customer security posture, at least in part based on the identifier of the workload and the identifier of the application. Further, the processor determines to deny the launch request, at least in part based on the policy and the customer security posture.

20 Claims, 6 Drawing Sheets

400

SYSTEM AND METHOD TO CREATE ZERO TRUST FRAMEWORK FOR SECURITY AS A SERVICE

CROSS-REFERENCE TO RELATED APPLICATIONS

This application claims the benefit of priority under 35 U.S.C. § 119(e) to Indian Provisional Application No. 202141017536, entitled "SYSTEM AND METHOD TO CREATE ZERO TRUST FRAMEWORK FOR SECURITY AS A SERVICE," inventors Bhattacharya et al., filed in the Indian Patent Office on Apr. 15, 2021, which is hereby incorporated by reference in its entirety. This application is related to concurrently-filed applications entitled "HEURISTIC MODEL TO SELF-MANAGE AND AUTO-UPDATE CONTAINERIZED SERVICES," inventors Bhattacharya et al., and "DISTRIBUTED HYBRID MODEL FOR SECURITY AS A SERVICE," inventors Bhattacharya et al., both of which are hereby incorporated by reference in their entireties.

BACKGROUND

Technical Field

This disclosure relates to computer security and, in particular, a zero trust framework.

Related Art

Recently, enterprise infrastructure has grown increasingly complex with resources distributed across internal networks, the cloud, remote devices, and the like. Traditional perimeter-based security cannot ensure that workloads within a perimeter are trusted. Once the perimeter is breached, then access to resources can become unhindered.

Zero trust security provides network security in which no entity is trusted by default from inside or outside the network. As a result, such a system demands verification from any entity trying to gain access to a resource. In various examples, a resource is a data source, such as an enterprise-owned device, a storage, a cloud component, and even a SAAS (software as a service) application. Thus, before the resource is accessed, the entity undergoes an authorization and authentication mechanism by a policy enforcement point.

Traditional authentication and authorization models to validate application programming interface (API) calls cannot guarantee that service consumers are not bad actors or are compromised.

Zero trust priorities recently evolved and, as a result, now demand solutions that secure a remote workforce with an easy-to-use and end-to-end zero trust approach.

A SECaaS (Security as a Service) model provides security services, hosted as SAAS services, with consistent and uniform protection and centralized security policy management. These services expose security application programming interfaces (APIs) for the consumers to obtain security as a service. This exposure presents concerns of potential SECaaS security risks like data breach, unauthorized access, application vulnerabilities, and other cyberattacks.

Conventionally, solutions to secure security API calls are either based on credentials (e.g., are credential-based) or on authorization tokens (e.g., are authorization-role-based).

Compromise of the credentials or authorized clients, user roles, or applications presents a concern of cyberattacks and data breach.

BRIEF SUMMARY

An apparatus includes a network interface that performs a reception of a launch request and receives a policy. The launch request includes an identifier of a workload and an identifier of an application. The apparatus further includes a processor configured to determine a customer security posture, at least in part based on the identifier of the workload and the identifier of the application, and to determine to deny the launch request, at least in part based on the policy and the customer security posture.

DETAILED DESCRIPTION

Figure 1:
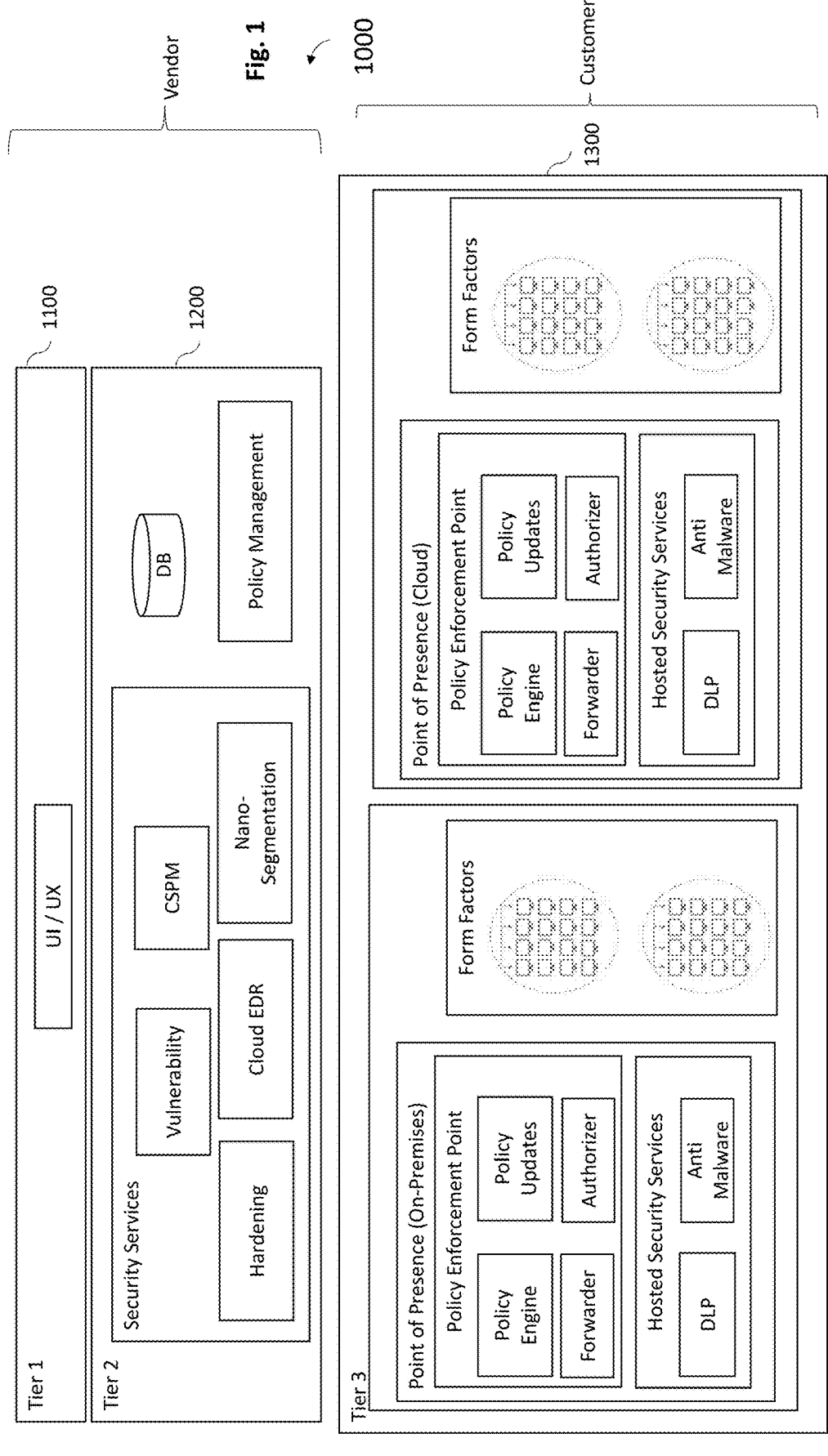
FIG. 1 depicts a block diagram of an example zero trust framework for SECaaS services, according to various implementations of the present disclosure.

For purposes of illustrating the present innovation, it might be useful to understand phenomena relevant to various implementations of the disclosure. The following foundational information can be viewed as a basis from which the present disclosure can be explained. Such information is offered for purposes of explanation only and, accordingly, should not be construed to limit the scope of the present disclosure and its potential applications.

Access to data resources should be continuously evaluated for security purposes. Therefore, various implementations of the present disclosure provide a Zero Trust framework for SECaaS services. Some implementations continuously evaluate the security posture and risk score for a client, a user, or an application making calls for access to API resources and accordingly allows or denies the access to the APIs.

None of the existing solutions evaluates the security posture and risk score for the client, the user, or the application making the API calls and accordingly allows or denies the access to the APIs.

In specific implementations of the present disclosure, a system and/or a method provide a zero trust framework for SECaaS services. In some implementations, a POP (Point of Presence) runs in a customer environment as a policy enforcement point driven through dynamic policies.

In various implementations, the POP can serve as a controlling point to all security-related API calls. Specifically, the POP can serve as a security gatekeeper for calls made to hosted security services or SAAS applications. These calls, going to the cloud or edge services, can be made by a client, a user, or an application. The POP serves as a decision point to continuously evaluate the risk score and security posture of the client, the user, or the application. The POP evaluates access to the security services on a per-session basis, according to various implementations.

Dynamic polices drive the POP to continuously evaluate the security posture of the SECaaS service consumers. In various implementations, the policies are based on the security posture, the identity, and the behavior of the service consumers. The policies ensure no security API requests are trusted, whether they originate within the network perimeter, as in case of edge services, or in the cloud. The policies can be managed from a centralized SAAS platform that eliminates the management overhead from information technology (IT) teams, in various implementations.

Thus, select implementations of the system can protect customer data from cyberattacks. In various implementations, the system assumes that any call to access a security API is not trusted and therefore performs continuous evaluation for such calls on a per-session basis.

Further, by driving the dynamic policies by the security posture and/or risk score of a service consumer, compromise of the security services can be prevented. Various implementations of the system can protect both security services hosted in the cloud or hosted as edge services.

FIG. 1 depicts a block diagram of an example zero trust framework for SECaaS services, according to various implementations of the present disclosure. Specifically, FIG. 1 depicts a hybrid model 1000 based on a three-tiered architecture. As shown in FIG. 1, tier 1 1100 and tier 2 1200 reside within a perimeter of a security vendor that provides SECaaS services. One example of a security vendor is Musarubra US LLC of Plano, TX Further, tier 3 1300 resides within the infrastructure of a customer of the security vendor. As shown in the implementation of FIG. 1, the infrastructure can include points of presence located both physically on-premises (e.g., at the customer's place of business) as well as virtually in the cloud (e.g., not at the customer's place of business).

Thus, in some implementations, the POPs can be hybrid in the sense that the POPs are both located within the physical perimeter of the customer's premises, as well as virtually in the cloud. Further, the POPs can be distributed in the sense that multiple POPs are located within the physical perimeter of the customer's premises. The POPs can also be distributed in the cloud, if multiple POPs are located in different physical locations (e.g., in different data centers). Further, some implementations are both distributed and hybrid.

Tier 1 1100 is a visualization tier including a user interface (UI)/user experience (UX) element. The UI/UX can be, for example, a visualization pane. In various implementations, the visualization pane includes a management console. In specific implementations, IT administrators or security operations centers (SOCs) can use the management console to define policies and configurations for the zero trust framework.

Further, the visualization pane can also serve as a console to visualize the security posture of the customer's infrastructure and workloads. By better understanding the security postures, administrators or SOCs can continuously improve the policies that drive the zero trust framework.

Tier 2 1200 is a management tier including a database, security services, and a policy management element. The management can be, for example, a management pane. In various implementations, the management pane serves as a centralized orchestration platform for the zero trust policies for the distributed and/or hybrid infrastructure of the customer. The management tier can implement these policies dynamically and, further, can continuously improve the policies. The management tier can improve the policies, based on the risk score and security posture of the workloads and the users in the customer infrastructure, according to various implementations. Additionally, in select implementations, the management tier can push the policies to the policy enforcement points as POPs implemented across the public cloud and on-premises datacenters. These policies can serve as an input to a policy evaluation engine that continuously evaluates the security API calls made within the network or in the cloud, according to various implementations.

The policy management element of Tier 2 1200 can determine a policy for the zero trust framework, as discussed later.

In various implementations, Tier 2 1200 can provide SECaaS services. In the implementation shown in FIG. 1, the SECaaS services include a vulnerability analysis, hardening, cloud security posture management (CSPM), cloud endpoint detection and response (EDR), and nano-segmentation.

Tier 3 1300 includes one or more POPs under the control of the customer of the SECaaS services. As shown in FIG. 1, the POP can include a policy engine, policy updated, a forwarder functionality, and an authorizer. The POP also includes hosted security services, such as data loss prevention (DLP), anti-malware, and a firewall (not pictured).

The customer's infrastructure additionally can include form factors, such as virtual machines (VMs), containers, and storage. In various implementations, the form factors perform a mutual authentication to communicate with the POP.

In various implementations, at least one of the POPs serves as a security gatekeeper for calls made to security APIs within the customer's network perimeter or outside to SAAS applications (e.g., in Tier 2 1200). Through this gatekeeping functionality, the POP can produce a secure channel of communication to the security APIs. In various implementations, the POP is the first checkpoint for access by security calls to the security APIs and therefore first authenticates and authorizes the security calls.

The authorizer can ensure least privilege access from an entity to at least one of the security APIs. Once the authorizer successfully authorizes the entity, then the client (e.g., user or workload) security posture is evaluated by the policy evaluation engine based on various attributes. In some implementations, these attributes can be or include a risk score, threat landscape, behavior and environmental attributes, an identity, activities, configurations, infrastructure security posture, and compliance status. In other implementations, the security posture can be evaluated based on other attributes, as well.

In various implementations, based on the continuous evaluation results, the zero trust framework system can allow clients to access the security APIs. Various implementations of the system perform the compliance assessment on a per-session basis to ensure any deviation in the security posture of clients can be evaluated and identified.

The forwarder functionality can forward the API call to the security API or other resource, after the authorizer successfully authorizes the entity for a session.

Figure 2:
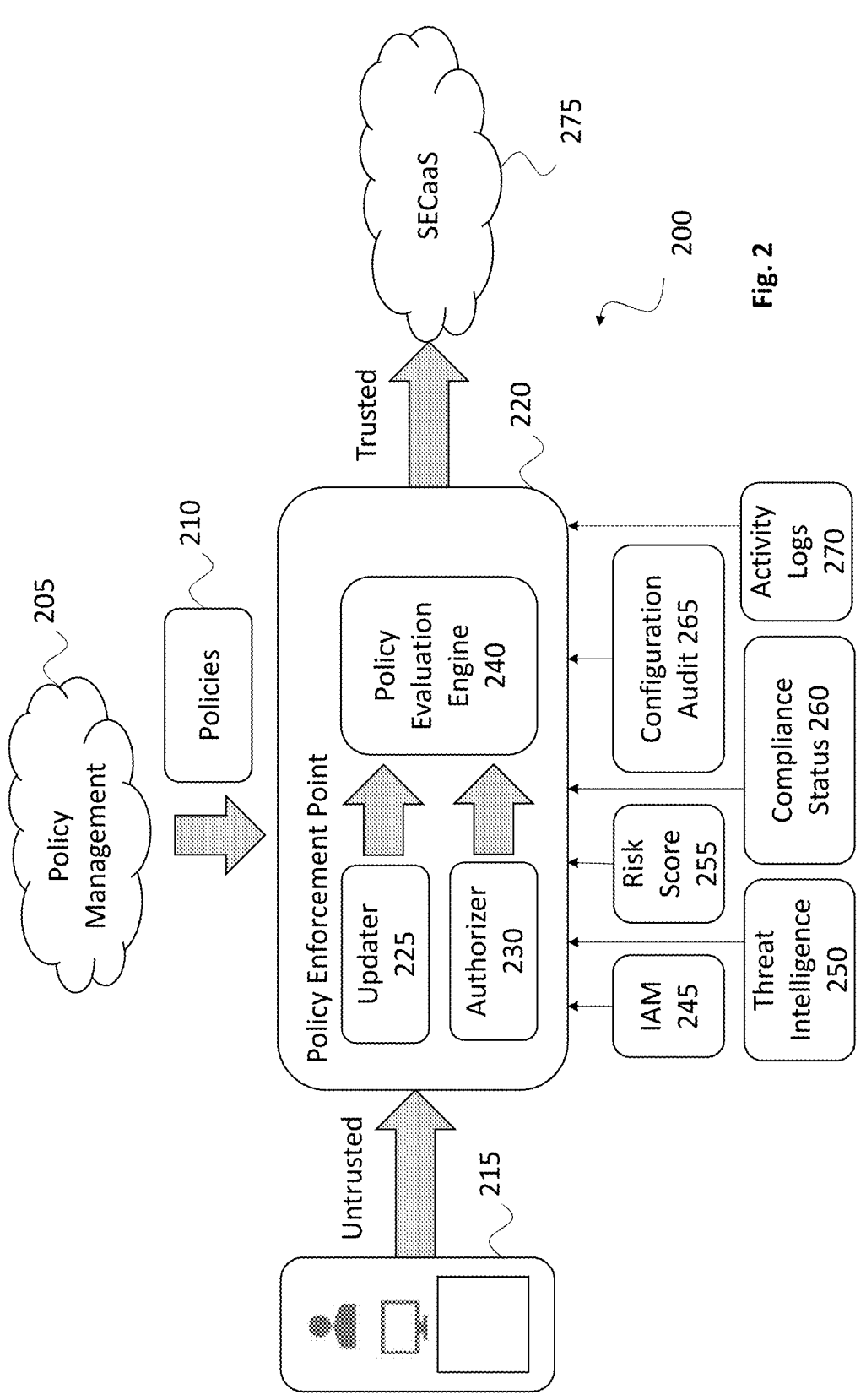
FIG. 2 depicts an example block diagram that shows the components for a aero trust framework policy enforcement point, according to various implementations.

FIG. 2 depicts an example block diagram that shows the components for a zero trust framework policy enforcement point, according to various implementations. As shown in FIG. 2, the policy enforcement point 220 receives updated policies 210 from a policy management server 205, such as the policy management in Tier 2 1200. The policy enforcement point 220 can allow or deny a call from one of the service consumers 215 to a security API 275, based on a security posture of the one of the service consumers 215. The policy enforcement point 220 also includes an authorizer 230 that authorizes calls to the security API 275.

In various implementations, the policy enforcement point 220 can also additionally serve as a service platform for hosting security services that require the customer's sensitive data for assessment. This hosting additionally can ensure the customer data does not leave the customer perimeter and, thus, that data privacy is preserved.

In some implementations, the policy enforcement point 220 continuously evaluates calls to the security API 275 beyond the authentication and authorization. In select implementations, the policy enforcement point allows the calls based on the risk scores for the service consumers 215.

In the implementation shown in FIG. 2, inputs to the policy evaluation engine 240 include identity and access management (IAM) 245, threat intelligence 250, risk score 255, compliance status 260, configuration audit 265, and activity log 270.

IAM 245 can consider, for example, the identity and access of the service consumers 215.

The threat intelligence 250 considers signals received from other security products running within the customer environment. In various implementations, such security products can be a gateway appliance, an internet service provider (ISP) appliance, and/or a firewall appliance. In various implementations, the threat intelligence can identify what ports are exposed, whether users are using remote desktop protocol (RDP), or the applications in the workload that connect to a third-party to allow external users to login.

The risk score 255 is a score based on a VM or container that produced the client workload, an evaluation of the hardware on which the VM or container is running, what kind of data it has, what kind of workload it has (database workload or web workload).

The compliance status 260 considers what kind of policy is present and whether the cloud workload complies with the policy.

The configuration audit 265 considers whether the configuration is compliant with a policy, such as password, is there a properly configured firewall, whether user logins are restricted.

The activity log 270 can include, for example, activities performed by the service consumers 215. Other telemetry data can consider whether the application has a known vulnerability (e.g., is remotely exploitable).

Figure 3:
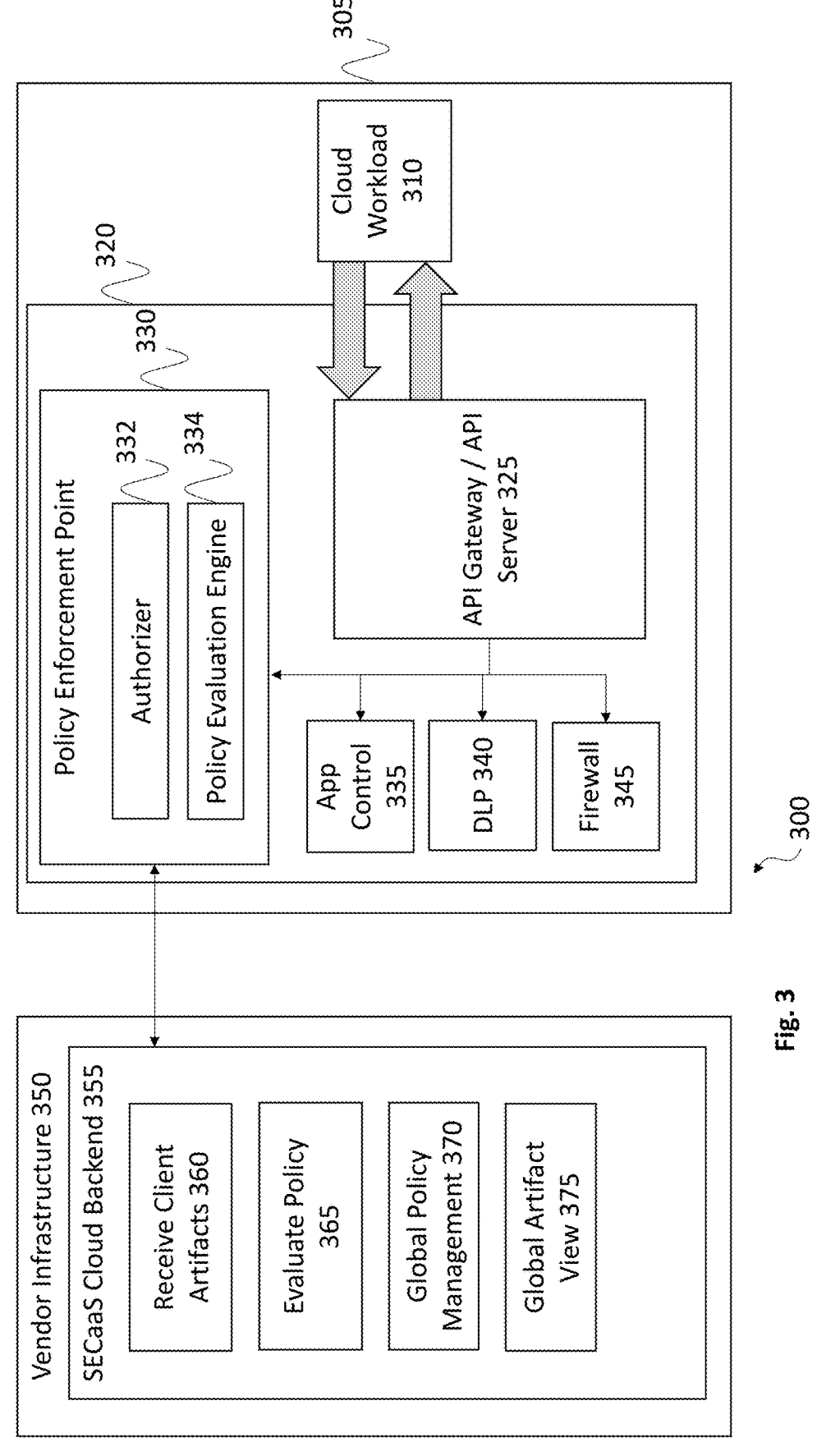
FIG. 3 illustrates a logical diagram of a zero trust framework, according to an implementation of the present disclosure.

FIG. 3 illustrates a logical diagram of a zero trust framework 300, according to an implementation of the present disclosure. The zero trust framework 300 includes customer infrastructure 305 and vendor infrastructure 350.

The customer infrastructure 305 includes a cloud workload 310 and a POP 320, hosted as a SECaaS hybrid POP. In various implementations, the cloud workload 310 can represent a workload generated by a user or a device. The cloud workload 310 can be from a virtual machine (VM), a container, or from a server-less implementation.

The POP 320 includes an API gateway/API server 325, a policy enforcement point 330, an app control service 335, a DLP 340, and a firewall 345.

The cloud workload 310 transmits, to the API gateway/API server 325, a request for access. For example, the cloud workload 310 can request access to launch an application. In other implementations, the cloud workload 310 can request access to a security service, such as DLP 340 or firewall 345. In additional implementations, the cloud workload 310 can request access to an external network, such as to a security service hosted in the vendor infrastructure 350. The request for access can include an identifier of the cloud workload and an identifier of the resource to be accessed (e.g., the application, the security service, or the external network). In various implementations, the request includes authentication information for use by later-described authorizer 332.

The API gateway/API server 325 receives the request and forwards it to the policy enforcement point 330. The policy enforcement point 330 includes an authorizer 332 and a policy evaluation engine 334.

The authorizer 332 validates authentication information received from the cloud workload 310. The authentication can be any conventional authentication. For example, if the cloud workload 310 is driven by a human user, the authentication can be performed by prompting the human user for a login and password. Other forms of authentication are possible, such as sharing a predetermined secret key, a token-based authentication, or a certificate-based authentication. In addition, the authorizer 332 validates least privilege access granted to the cloud workload 310.

The policy evaluation engine 334 evaluates the client security posture based on one or more attributes, such as a risk score, threat landscape (e.g., threat intelligence), configuration, compliance status, and/or any other threat intelligence telemetry data. Further, the policy evaluation engine 334 can apply zero trust policy settings to the access request.

In a first use case, the cloud workload 310 sends an access request to app control service 335 to launch a process that makes an outgoing connection to the Internet (e.g., to vendor infrastructure 350). The policy enforcement point 330 receives the access request and evaluates the threat landscape and/or the compliance status of the access request and/or the cloud workload 310. The policy enforcement point 330 can produce an evaluation result based on a determination whether the compliance status complies with a policy. The policy enforcement point 330 can forward the evaluation result to the app control service 335.

In this first use case, the app control service 335 receives an access request to launch the process. The app control service 335 can then determine whether it has received an evaluation result from the policy enforcement point indicating successful compliance with the policy. If the app control service 335 determines that it has not received an evaluation result or that it has received an evaluation result indicating a compliance failure, then the app control service 335 denies the access request. If the app control service 335 determines that it has received an evaluation result indicating a compliance success, then the app control service 335 performs additional checks on the access request, such as whether the checksum of the process matches a predetermined checksum, whether there are known issues with the cloud workload 310, and what the origin of the process is (e.g., whether process originates from a trusted developer). If the app control service 335 determines that the access request successfully passes the additional checks, then the app control service 335 grants the access request. If the app control service 335 determines the access request does not pass the additional checks, then the app control service 335 denies the access request.

In a second use case, the cloud workload 310 sends an access request for accessing restricted data to DLP 340. Then, the policy enforcement point 330 can deny the access request, if the policy enforcement point 330 detects a denial-of-service (DoS) attack or other malicious attempt on DLP 340 or other security services. Indeed, the policy enforcement point 330 can deny an access request from the cloud workload 310 to all services (i.e., not just to DLP 340).

Figure 4:
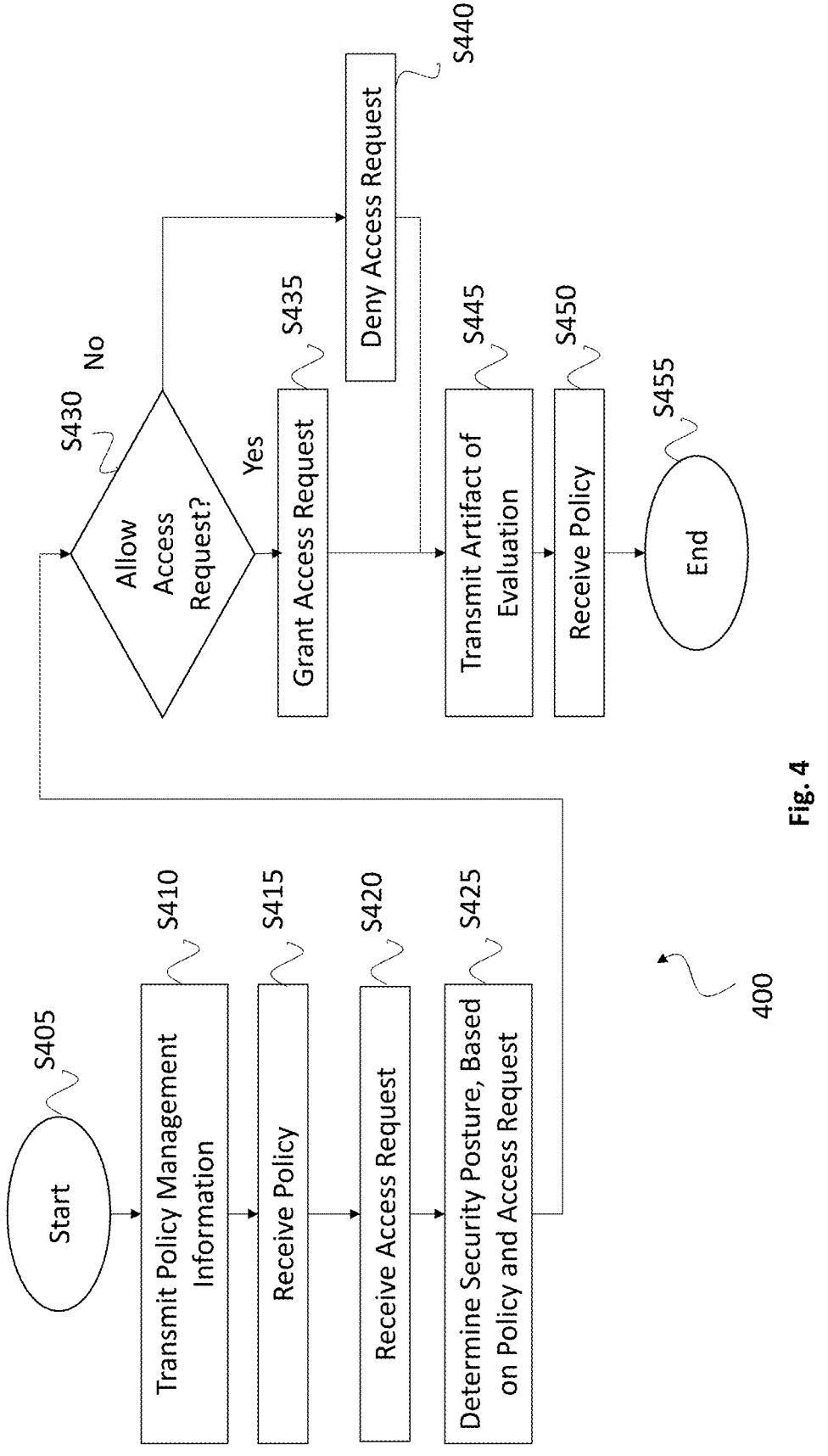
FIG. 4 illustrates an algorithm for a workflow performed by a customer, according to an implementation of the present disclosure.

FIG. 4 illustrates an algorithm 400 for a workflow performed by a policy enforcement point, according to an implementation of the present disclosure. The algorithm 400 begins at S405 and advances to S410.

At S410, the policy enforcement point 330 transmits policy management information to the management pane of the vendor infrastructure 350. In some implementations, the policy management information is transmitted via a user interface received from the visualization pane of the vendor infrastructure.

In some implementations, the policy management information can include an identifier of a resource, such as an application, an API, or a network resource. In many implementations, the policy management information can include an identifier of an application that can produce the cloud workload 310.

The policy management information includes a customer preference for a policy and includes an identifier of the policy enforcement point 330. The customer preference can be, for example, a prohibition on personally identifiable information (PII) leaving the boundaries of the customer infrastructure 305.

The algorithm 400 then advances to S415.

In S415, the policy enforcement point 330 receives a policy from the vendor infrastructure 350. The algorithm 400 then advances to S420.

S420, the policy enforcement point 330 receives an access request from a cloud workload 310. The access request includes an identifier of the cloud workload 310.

In various implementations, the access request can be a launch request to launch an application, an API request to lookup information using an API, or a network access request for access to a resource (e.g., to vendor infrastructure 350 or to a third-party apparatus) on a network outside of the customer infrastructure 305. The access request also can include an identifier of a resource to be accessed. Thus, if the access request is a launch request, the access request can include an identifier of the application. If the access request is an API request, the access request can include an identifier of the API. If the access request is a network access request, the access request can include an identifier of the resource.

Further, the access request can include information for the policy evaluation. For example, the access request can include an identifier of a user that created the cloud workload 310. The access request can include an identifier of the hardware on which the cloud workload 310 originated. The access request can include an identifier of an application that created the cloud workload 310. The access request can include an identifier of a VM or container that created the cloud workload 310. The access request can include an identifier of whether the cloud workload 310 is a database workload or a web workload. The access request can also include other information, as well.

The algorithm 400 then advances to S425.

In S425, the policy enforcement point 330 determines the security posture, at least in part based on the policy received in S415 and the access request received in S420. For example, the policy enforcement point 330 can determine a risk score of the access request, at least in part based on the identifier of the cloud workload 310 and/or the identifier of the resource. The policy enforcement point 330 can determine the threat landscape, at least in part based on the identifier of the application that produced the cloud workload 310. The policy enforcement point 330 can also determine activities performed by the cloud workload 310, such as whether the cloud workload 310 has performed a DoS attack. The policy enforcement point 330 can determine the security posture, at least in part based on the risk score, the threat landscape, and/or the activities. The algorithm 400 then advances to S430.

In S430, the policy enforcement point 330 can then compare the security posture to contents of the policy to determine whether to allow the access request. For example, the policy enforcement point 330 can determine whether the risk score exceeds a predetermined risk value included in the policy. The policy enforcement point 330 can also determine whether a password for the cloud workload 310 complies with hardening rules (e.g., minimum password length, presence of wildcard characters) set in the policy.

If the policy enforcement point 330 determines to allow the access request, the algorithm advances to S435. If the policy enforcement point 330 determines not to allow (e.g., deny) the access request, the algorithm 400 advances to S440.

In S435, the policy enforcement point 330 grants access to the resource. In various implementations, the policy enforcement point 330 forwards the access request to the resource. In multiple implementations, the policy enforcement point additionally or alternatively transmits to the resource an evaluation result indicating the success of the evaluation. The algorithm 400 then advances to S445.

In S440, the policy enforcement point 330 denies access to the resource. In plural implementations, the policy enforcement point 330 transmits to the cloud workload 310 a response indicating that the access request was denied. In select implementations, the policy enforcement point 330 additionally or alternatively does not forward the access request to the resource. In some implementations, the policy enforcement point 330 additionally or alternatively transmits to the resource an evaluation result indicating the failure of the evaluation. The algorithm 400 then advances to S445.

In S445, the policy enforcement point 330 transmits an artifact of the evaluation to the SECaaS cloud backend 355. The artifact can be, for example, the access request itself or a file to which the cloud workload 310 requested access. The artifact can also include at least a portion of the threat intelligence. The algorithm 400 then advances to S450.

S450, the policy enforcement point 330 receives an updated policy from the SECaaS cloud backend 355. The algorithm 400 then advances to S455 and concludes.

In the implementation illustrated in FIG. 4, the policy enforcement point 330 itself determines whether to allow the access request. In some implementations, the resource itself instead determines whether to allow the access request. In such implementations, the policy enforcement point 330 generally transmits the evaluation result to the resource in S435 or S440.

Figure 5:
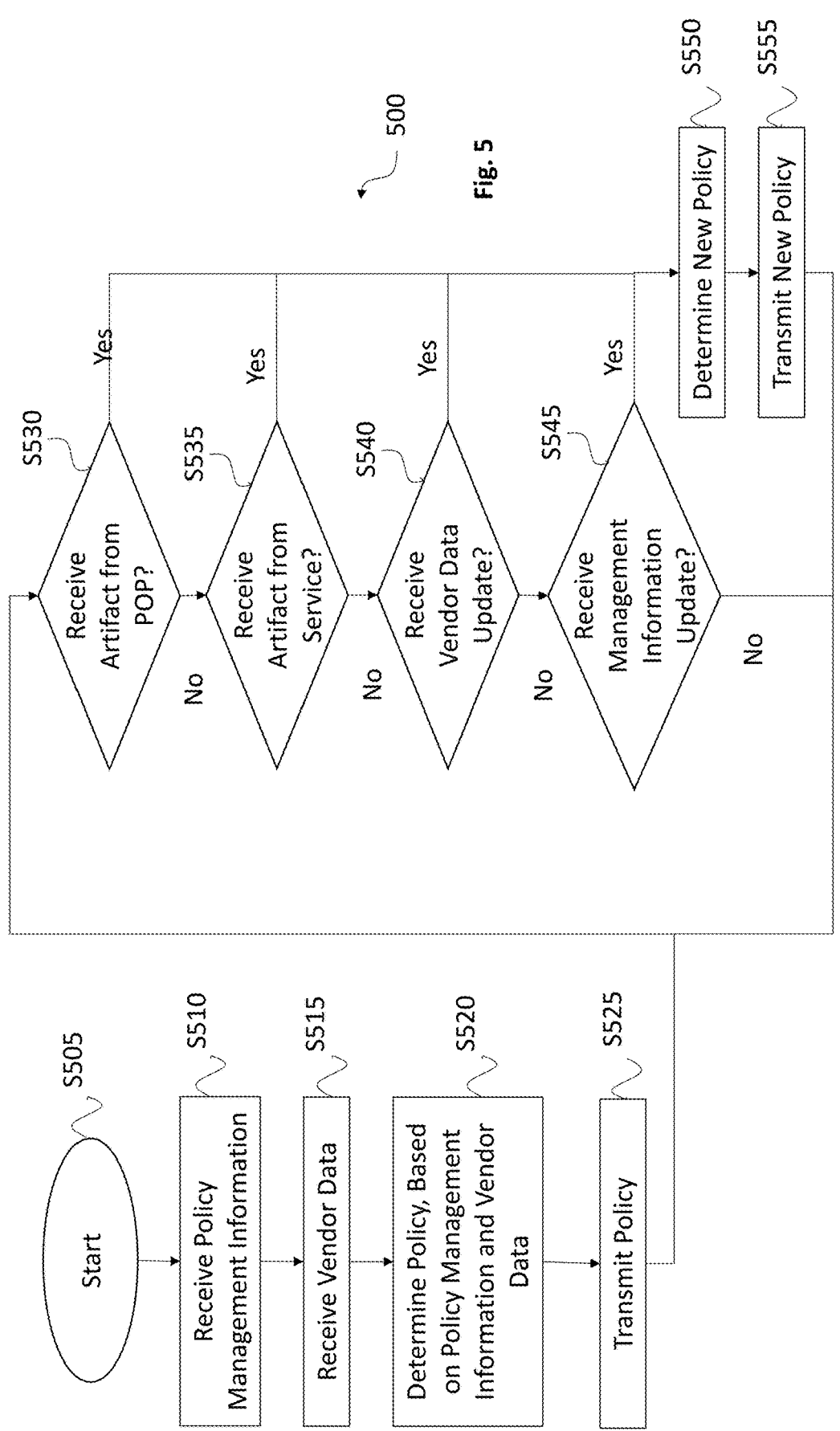
FIG. 5 illustrates an algorithm for a workflow performed by a customer, according to an implementation of the present disclosure.

FIG. 5 illustrates an algorithm 500 for a workflow performed by a SECaaS cloud backend 355, according to an implementation of the present disclosure. The algorithm 500 begins at S505 and advances to S510.

In S510, the management pane of the SECaaS cloud backend 355 receives the policy management information transmitted from the policy enforcement point 330 in S410. In at least one implementation, a visualization pane of the SECaaS cloud backend 355 can present a user interface through which a user can configure the policy management information. As discussed above, the policy management information can include an identifier of a resource and/or an identifier of an application that can produce the cloud workload 310. The policy management information can additionally or alternatively include a customer preference for a policy. The policy management information also includes an identifier of the policy enforcement point 330. In addition, the policy management information can include threat intelligence regarding the POP. The algorithm 500 then advances to S520.

In S520, the SECaaS cloud backend 355 receives vendor data. The vendor data can include, for example, vulnerabilities of the resource, the application, and/or the cloud workload 310. In some implementations, a vendor (such as Musarubra US LLC) can transmit the vendor data, either periodically or based on an urgent update. The vendor data includes data regarding the API services, applications, and other resources available in Tier 3 1300 for a particular customer. Further, because the SECaaS cloud backend 355 typically manages more than one customer infrastructure 305, the vendor data typically includes data for global policy management (e.g., addressing API services, applications, and other resources not available in the customer infrastructure 305).

Nevertheless, in select implementations, the SECaaS cloud backend 355 can transmit a request for the vendor data to the vendor, and the vendor can transmit a response including the vendor data. That is, in some implementations, the vendor data can be available on-demand.

The algorithm 500 then advances to S520.

In S520, the SECaaS cloud backend 355 determines a policy, at least in part based on the management information received in S510 and the vendor data received in S515. For example, the SECaaS cloud backend 355 can compare an identifier of an element (e.g., an application, a workload, a security service, an API) in the policy management information with elements in the vendor data to determine a concern. The SECaaS cloud backend 355 can add the concern to the policy. In some implementations, the policy additionally includes the identifier of the element. In select implementations, the SECaaS cloud backend 355 can exclude the concern from the policy, if the customer preference received in the policy management information indicates to do so. In various implementations, the SECaaS cloud backend 355 does not add the concern to the policy, if the customer preference does not indicate adding the concern.

The algorithm 500 then advances to S525.

In S525, the SECaaS cloud backend 355 transmits the policy to the policy enforcement point 330. The transmission of the policy can be based at least in part on the identifier of the policy enforcement point 330 included in the policy management information. The algorithm 500 then advances to S530.

In S530, the SECaaS cloud backend 355 determines whether it has received a client artifact from the policy enforcement point 330. If the SECaaS cloud backend 355 determines it has received a client artifact from the policy enforcement point 330, then the algorithm 500 advances to S550. If the SECaaS cloud backend 355 determines it has not received a client artifact from the policy enforcement point 330_m_ then the algorithm 500 advances to S535.

In S535, the SECaaS cloud backend 355 determines whether it has received an artifact for an element identified by the policy management information. For example, the SECaaS cloud backend 355 determines whether the artifact corresponds to the cloud workload 310, the application, or the security service. In many implementations, the SECaaS cloud backend 355 receives this artifact from a different policy enforcement point than the policy enforcement point 330. For example, if the policy enforcement point 330 is on the premises of the customer, then the SECaaS cloud backend 355 can receive the artifact in S535 from a cloud of the customer. Alternatively, the SECaaS cloud backend 355 can receive the artifact in S535 from a policy enforcement point of a different customer.

The algorithm 500 then advances to S540.

In S540, the SECaaS cloud backend 355 determines whether it has received a vendor data update. For example, the SECaaS cloud backend 355 can receive a periodic or urgent update from a developer. If the SECaaS cloud backend 355 receives a vendor data update, the algorithm 500 advances to S550. If the SECaaS cloud backend 355 does not receive a vendor data update, the algorithm 500 advances to S545.

In S545, the SECaaS cloud backend 355 determines whether it has received a policy management information update. For example, the management pane of the SECaaS cloud backend 355 can receive updated policy management information from the policy enforcement point 330. If the SECaaS cloud backend 355 determines it has received a policy management information update, then the algorithm 500 advances to S550. If the SECaaS cloud backend 355 determines it has not received a policy management information update, then the algorithm 500 returns to S530 to perform a continual evaluation.

In S550, the SECaaS cloud backend 355 determines a new policy for the policy enforcement point 330. The new policy is based at least in part on the change in information (e.g., the artifact in S530, the artifact in S525, the vendor data ion S540, or the policy management information in S545). The algorithm then advances to S555.

In S555, the SECaaS cloud backend 355 transmits the new policy to the policy enforcement point 330.

The implementation illustrated in FIG. 5 shows the determinations of S530, S535, S540, and S545 in a particular order. Needless to say, the order of the determinations can be rearranged in any order.

Figure 6:
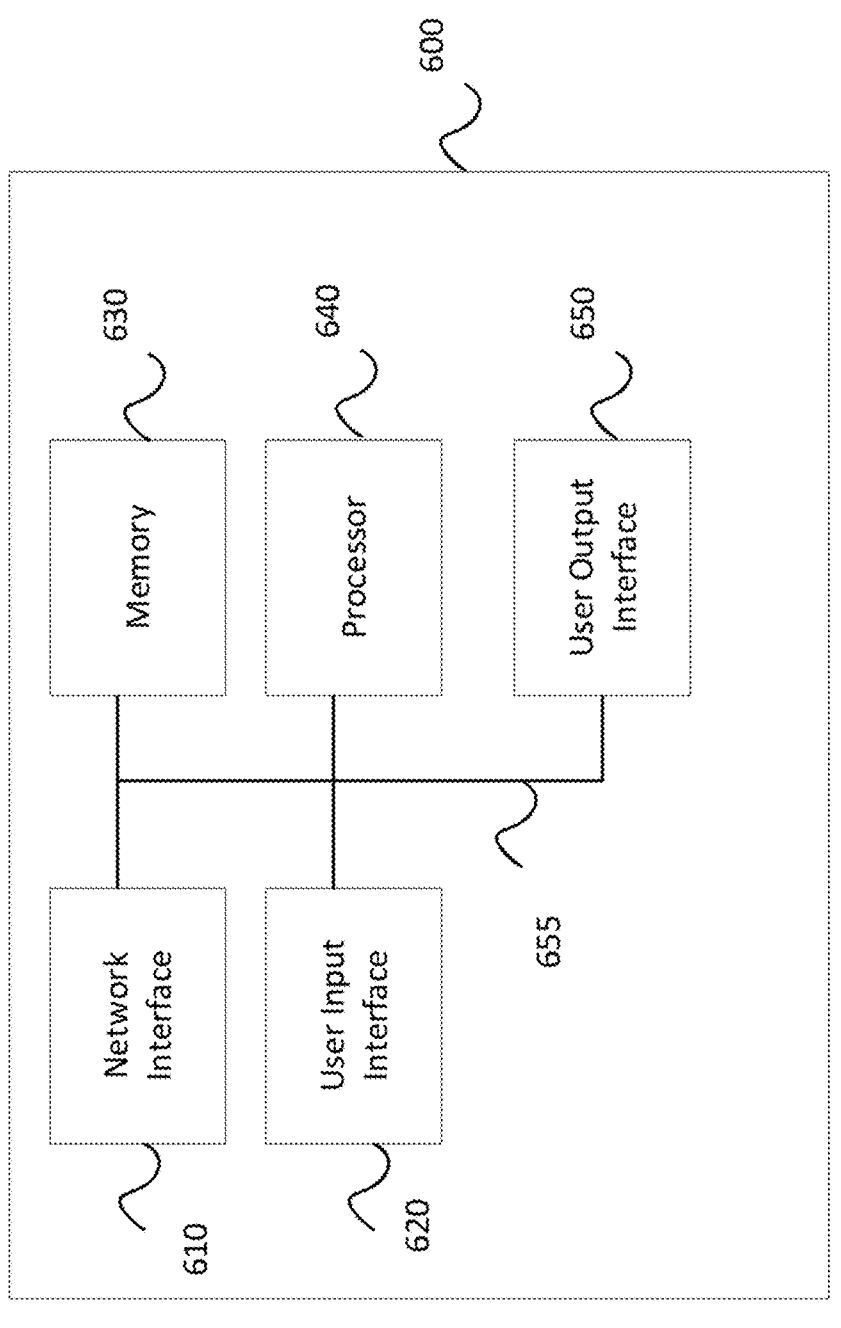
FIG. 6 illustrates a computing device, according to an implementation of the present disclosure.

FIG. 6 illustrates a computing device 600, according to an implementation of the present disclosure.

Although illustrated within a single housing, the computing device 600 can be distributed across plural housings or sub-systems that cooperate in executing program instructions. In some implementations, the computing device 600 can include one or more blade server devices, standalone server devices, personal computers (including laptop computers and tablet computers), routers, hubs, switches, bridges, firewall devices, intrusion detection devices, mainframe computers, network-attached storage devices, video game systems, smartphones and other mobile telephones, and other computing devices. The computing device 600 can execute the Windows® operating system (OS), Linux OS, or Android OS in many implementations. The hardware of the computing device 600 can be configured according to a Symmetric Multi-Processing (SMP) architecture or a Non-Uniform Memory Access (NUMA) architecture.

The computing device 600 can include a network interface 610 that provides one or more communication connections and/or one or more devices that allow for communication between the computing device 600 and other computing systems (not shown) over a communication network or collection of networks (not shown) or the air. The network interface can communicate using near-field communications (NFC), Wi-Fi™, Bluetooth, Ethernet, cellular (e.g., 4G, 5G), facsimile, or any other wired or wireless interface.

The computing device 600 can also include a user input interface 620 that receives inputs from a human. The user input interface 620 can be or include a mouse, a touchpad, a keyboard, a touchscreen, a trackball, a camera, a microphone, a joystick, a game controller, a scanner, a drawing tablet, or any other input device.

The computing device 600 can include a memory 630, also termed a "storage." The memory 630 can include or be one or more computer-readable storage media readable by a processor 640 and that store software. The memory 630 can be implemented as one storage device and can also be implemented across multiple co-located or distributed storage devices or sub-systems. The memory 630 can include additional elements, such as a memory controller, that communicate with the processor 640. The memory 630 can also include storage devices and/or sub-systems on which data and/or instructions are stored. The computing device 600 can access one or more storage resources to access information (e.g., a program) to carry out any of the processes indicated in this disclosure and, in particular, FIGS. 4-5.

The memory 630 can be or include a read-only memory (ROM), a programmable ROM (PROM), an erasable PROM (EPROM), an electrically erasable PROM (EEPROM), a random-access memory (RAM), a dynamic RAM (DRAM), a static RAM (SRAM), a hard drive, a cache memory, a flash memory, a removable disk, or a tape reel. The memory 630 can be or include resistive RAM (RRAM) or a magneto-resistive RAM (MRAM). Other implementations are possible.

A zero trust framework program stored in memory 630 can include routines for at least partially performing at least one of the processes illustrated in FIGS. 4-5 and can be implemented in program instructions. Further, the software, when executed by the computing device 600 in general or the processor 640 specifically, can direct, among other functions, the computing device 600 or the processor 640 to perform the zero trust methodology as described herein.

The computing device 600 can include a processor 640 (e.g., a processing unit). The processor 640 can perform the operations of the policy enforcement point or the SECaaS cloud backend. The processor 640 can be or include one or more hardware processors and/or other circuitry that retrieve and execute software from the memory 630. The processor 640 can be implemented within one processing device, chip, or package and can also be distributed across multiple processing devices, chips, packages, or sub-systems that cooperate in executing program instructions. In some implementations, the processor 640 is or includes a Graphics Processing Unit (GPU).

The processor 640 can have any register size, such as a 32-bit register or a 64-bit register, among others. The processor 640 can include multiple cores. Implementations of the processor 640 are not limited to any particular number of threads. The processor 640 can be fabricated by any process technology, such as 14 nm process technology.

The computing device 600 can also include a user output interface 650 that outputs information to a human user. The user output interface 650 can be or include a display (e.g., a screen), a touchscreen, speakers, a printer, or a haptic feedback unit. In many implementations, the user output interface 650 can be combined with the user input interface 620 to include, for example, a touchscreen or a headset including headphones and a microphone.

The computing device 600 also includes a bus 655. The components of computing device 600 can communicate with each other via the bus 655.

In implementations including multiple computing devices, a server of the system or, in a serverless implementation, a peer can use one or more communications networks that facilitate communication among the computing devices. For example, the one or more communications networks can include or be a local area network (LAN), a wide area network (WAN), or a metropolitan area network (MAN) that facilitate communication among the computing devices. One or more direct communication links can be included between the computing devices. In addition, in some cases, the computing devices can be installed at geographically distributed locations. In other cases, the multiple computing devices can be installed at one geographic location, such as a server farm or an office.

As used herein, the terms "storage media" or "computer-readable storage media" can refer to non-transitory storage media, such as non-limiting examples of a hard drive, a memory chip, and cache memory, and to transitory storage media, such as carrier waves or propagating signals.

Aspects of the system for message queuing can be implemented in various manners (e.g., as a method, a system, a computer program product, or one or more computer-readable storage media). Accordingly, aspects of the present disclosure can take the form of a hardware implementation, a software implementation (including firmware, resident software, or micro-code) or an implementation combining software and hardware aspects that can generally be referred to herein as a "circuit," "module" or "system." Functions described in this disclosure can be implemented as an algorithm executed by one or more hardware processing units, e.g., one or more microprocessors of one or more computers. In various implementations, different operations and portions of the operations of the algorithms described can be performed by different processing units. Furthermore, aspects of the present disclosure can take the form of a computer program product implemented in one or more computer-readable media having computer-readable program code implemented, e.g., encoded or stored, thereon. In various implementations, such a computer program can, for example, be downloaded (or updated) to existing devices and systems or be stored upon manufacture of these devices and systems.

The detailed description presents various descriptions of specific implementations. The innovations described can be implemented in a multitude of different ways, for example, as defined and covered by the claims and/or select examples. In the description, reference is made to the drawings where like reference numerals can indicate identical or functionally similar elements. Elements illustrated in the drawings are not necessarily drawn to scale. Additionally, particular implementations can include more elements than illustrated in a drawing and/or a subset of the elements illustrated in a drawing. Further, some implementations can incorporate a suitable combination of features from two or more drawings.

The disclosure describes various illustrative implementations and examples for implementing the features and functionality of the present disclosure. The components, arrangements, and/or features are described in connection with various implementations and are merely examples to simplify the present disclosure and are not intended to be limiting. In the development of actual implementations, implementation-specific decisions can be made to achieve the developer's specific goals, including compliance with system, business, and/or legal constraints, which can vary from one implementation to another. Additionally, while such a development effort might be complex and time-consuming, it would be a routine undertaking for those of ordinary skill in the art having the benefit of this disclosure.

The systems, methods and devices of this disclosure have several innovative aspects, no one of which is solely responsible for the attributes disclosed herein. Some objects or advantages might not be achieved by implementations described herein. Thus, for example, certain implementations can operate in a manner that achieves or optimizes one advantage or group of advantages as taught herein and not other objects or advantages as taught or suggested herein.

In one example implementation, electrical circuits of the drawings can be implemented on a board of an electronic device. The board can be a general circuit board that can hold various components of the internal electronic system of the electronic device and, further, provide connectors for other peripherals. More specifically, the board can provide the electrical connections by which other components of the system can communicate electrically. Any processors (inclusive of digital signal processors, microprocessors, and supporting chipsets) and computer-readable memory elements can be coupled to the board based on configurations, processing demands, and computer designs. Other components such as external storage, additional sensors, controllers for audio/video display, and peripheral devices can be attached to the board as plug-in cards, via cables, or integrated into the board itself. In various implementations, the functionalities described herein can be implemented in emulation form as software or firmware running within one or more configurable (e.g., programmable) elements arranged in a structure that supports these functions. The software or firmware providing the emulation can be provided on one or more non-transitory, computer-readable storage media including instructions to allow one or more processors to carry out those functionalities.

In another example implementation, the electrical circuits of the drawings can be implemented as stand-alone modules (e.g., a device with associated components and circuitry configured to perform a specific application or function) or implemented as plug-in modules into application-specific hardware of electronic devices.

Implementations of the present disclosure can be readily included in a system-on-chip (SOC) package. An SOC represents an integrated circuit (IC) that integrates components of a computer or other electronic system into one chip. The SOC can contain digital, analog, mixed-signal, and radio frequency functions on one chip substrate. Other implementations can include a multi-chip-module (MCM) with a plurality of separate ICs located within one electronic package and that interact through the electronic package. In various other implementations, the processors can be implemented in one or more silicon cores in Application Specific Integrated Circuits (ASICs), Field Programmable Gate Arrays (FPGAs), a programmable logic array (PLA), programmable array logic (PAL), generic array logic (GAL), and other semiconductor chips.

The specifications, dimensions, and relationships outlined herein (e.g., the number of processors and logic operations) have been offered for non-limiting purposes of example and teaching. Such information can be varied considerably. For example, various modifications and changes can be made to arrangements of components. The description and drawings are, accordingly, to be regarded in an illustrative sense, not in a restrictive sense.

With the numerous examples provided herein, interaction was described in terms of two, three, four, or more electrical components for purposes of clarity and example. The system can be consolidated in any manner. Along similar design alternatives, the illustrated components, modules, and elements of the drawings can be combined in various possible configurations within the scope of this disclosure. In some cases, it is clearer to describe one or more of the functionalities of a given set of flows by referencing a reduced number of electrical elements. The electrical circuits of the drawings and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

In this disclosure, references to various features (e.g., elements, structures, modules, components, steps, operations, characteristics, etc.) included in "at least one implementation," "example implementation," "select implementations," "another implementation," "some implementations," "various implementations," "other implementations," "multiple implementations," and the like are intended to mean that any such features are included in one or more implementations of the present disclosure and might not necessarily be combined in the same implementations. Some operations can be deleted or omitted where appropriate, or these operations can be modified or changed considerably. In addition, the timing of these operations can be altered considerably. The preceding operational flows have been offered for purposes of example and discussion. Implementations described herein provide flexibility in that any suitable arrangements, chronologies, configurations, and timing mechanisms can be provided.

EXAMPLES

In Example A1, an apparatus includes a network interface that performs a reception of a launch request and receives a policy. The launch request includes an identifier of a workload and an identifier of an application. The apparatus further includes a processor configured to determine a customer security posture, at least in part based on the identifier of the workload and the identifier of the application, and to determine to deny the launch request, at least in part based on the policy and the customer security posture.

Example A2 is the apparatus of Example A1, wherein the network interface receives an application programming interface (API) request for access to a service, the API request includes the identifier of the workload, and the processor further is configured to deny the access to the service, at least in part based on the policy and the customer security posture.

Example A3 is the apparatus of any of Examples A1 or A2, wherein the network interface receives an access request for access to a vendor apparatus, the access request includes the identifier of the workload, and the processor further is configured to deny the access to the vendor apparatus, at least in part based on the policy and the customer security posture.

Example A4 is the apparatus of any of Examples A1-A3, wherein the network interface transmits a policy request, at least in part based on the reception of the launch request.

Example A5 is the apparatus of any of Examples A1-A4, wherein the processor further is configured to detect an event, and the network interface transmits an artifact of the event.

Example A6 is the apparatus of any of Examples A1-A5, wherein the network interface transmits policy management information including an identifier of the apparatus.

Example A7 is the apparatus of any of Examples A1-A6, wherein the processor further is configured to determine to allow a launch request, at least in part based on the policy and a customer security posture for another workload.

In Example A8, a method includes receiving a launch request including an identifier of a workload and an identifier of an application; receiving a policy for a service; determining a customer security posture, at least in part based on the identifier of the workload and the identifier of the application; and determining to deny the launch request, at least in part based on the policy and the customer security posture.

Example A9 is the method of Example A8, further comprising: receiving an application programming interface (API) request for access to the service, the API request including the identifier of the workload; and denying the access to the service, at least in part based on the policy and the customer security posture.

Example A10 is the method of Example A8 or Example A9, further comprising: receiving an access request for access to a vendor apparatus, the access request including the identifier of the workload; and denying the access to the vendor apparatus, at least in part based on the policy and the customer security posture.

Example A11 is the method of any of Examples A8-A10, further comprising: transmitting a policy request, at least in part based on the receiving the launch request.

Example A12 is the method of any of Examples A8-A11, further comprising: detecting an event; and transmitting an artifact of the event.

Example A13 is the method of any of Examples A8-A12, further comprising: transmitting policy management information including an identifier of an apparatus.

Example A14 is the method of any of Examples A8-A13, further comprising: determining to allow a launch request, at least in part based on the policy and a customer security posture for another workload.

In Example A15, a non-transitory, computer-readable medium is encoded with executable instructions that, when executed by a processing unit, perform operations comprising: receiving a launch request, wherein the launch request includes an identifier of a workload and an identifier of an application; receiving a policy for a service; determining a customer security posture, at least in part based on the identifier of the workload and the identifier of the application; and determining to deny the launch request, at least in part based on the policy and the customer security posture.

Example A16 is the medium of Example A15, the operations further comprising: receiving an application programming interface (API) request for access to the service, the API request including the identifier of the workload; and denying the access to the service, at least in part based on the policy and the customer security posture.

Example A17 is the medium of Example A15 or A16, the operations further comprising: receiving an access request for access to a vendor apparatus, the access request including the identifier of the workload; and denying the access to the vendor apparatus, at least in part based on the policy and the customer security posture.

Example A18 is the medium of any of Examples A15-A17, the operations further comprising: transmitting a policy request, at least in part based on the reception of the launch request.

Example A19 is the medium of any of Examples A15-A18, the operations further comprising: detecting an event; and transmitting an artifact of the event.

Example A20 is the medium of any of Examples A15-A19, the operations further comprising: determining to allow a launch request, at least in part based on the policy and a customer security posture for another workload.

Example A21 is the medium of any of Examples A15-A20, the operations further comprising: transmitting policy management information including an identifier of an apparatus including the processing unit.

In Example B1, an apparatus includes a network interface that receives first policy management information including an identifier of a point-of-presence (POP) and receives vendor data for a service; and a processor configured to determine a first policy for the service, at least in part based on the vendor data and the identifier of the POP, wherein the network interface transmits the first policy, at least in part based on the identifier of the POP.

Example B2 is the apparatus of Example B1, wherein the processor further is configured to perform a change in the first policy to produce a second policy, and the network interface transmits the second policy, at least in part based on the identifier of the POP.

Example B3 is the apparatus of Example B2, wherein the network interface receives an artifact transmission including a client artifact and the identifier of the POP, and the processor further is configured to perform the change, at least in part based on the client artifact.

Example B4 is the apparatus of any of Examples B2 or B3, wherein the network interface receives an artifact transmission including a client artifact and an identifier of a customer apparatus, and the processor further is configured to determine that the POP is within the customer apparatus, and to perform the change, at least in part based on the client artifact.

Example B5 is the apparatus of any of Examples B2-B4, wherein the network interface receives an update to the vendor data, and the processor further is configured to determine the POP uses the service, at least in part based on the identifier of the POP, and the processor further is configured to perform the change, at least in part based on the updated vendor data.

Example B6 is the apparatus of any of Examples B2-B5, wherein the network interface receives second policy management information, the second policy management information including an identifier of the service and the identifier of the POP, and the processor further is configured to perform the change, at least in part based on the identifier of the service and the identifier of the POP.

Example B7 is the apparatus of any of Examples B1-B6, wherein the first policy management information includes an identifier of an application or a checksum of an application.

In Example B8, a method includes receiving first policy management information including an identifier of a point-of-presence (POP); receiving vendor data for a service; determining a first policy for the service, at least in part based on the vendor data and the identifier of the POP; and transmitting the first policy, at least in part based on the identifier of the POP.

Example B9 is the method of Example B8, further comprising: performing a change in the first policy to produce a second policy; and transmitting the second policy, at least in part based on the identifier of the POP.

Example B10 is the method of Example B9, further comprising: receiving an artifact transmission including a client artifact and the identifier of the POP; and performing the change, at least in part based on the client artifact.

Example B11 is the method of Example B9 or Example B10, further comprising: receiving an artifact transmission including a client artifact and an identifier of a customer apparatus; determining the POP is within the customer apparatus; and performing the change, at least in part based on the client artifact.

Example B12 is the method of any of Examples B9-B11, further comprising: receiving an update to the vendor data; determining the POP uses the service, at least in part based on the identifier of the POP; and performing the change, at least in part based on the updated vendor data.

Example B13 is the method of any of Examples B9-B12, further comprising: receiving second policy management information, the second policy management information including an identifier of the service and the identifier of the POP; and performing the change, at least in part based on the identifier of the service and the identifier of the POP.

Example B14 is the method of any of Examples B8-B13, wherein the first policy management information includes an identifier of an application or a checksum of an application.

In Example B15, a non-transitory, computer-readable medium is encoded with executable instructions that, when executed by a processing unit, perform operations comprising: receiving first policy management information including an identifier of a point-of-presence (POP); receiving vendor data for a service; determining a first policy for the service, at least in part based on the vendor data and the identifier of the POP; and transmitting the first policy, at least in part based on the identifier of the POP.

Example B16 is the medium of Example B15, the operations further comprising: performing a change in the first policy to produce a second policy; and transmitting the second policy, at least in part based on the identifier of the POP.

Example B17 is the medium of Example B16, the operations further comprising: receiving an artifact transmission including a client artifact and the identifier of the POP; and performing the change, at least in part based on the client artifact.

Example B18 is the medium of Example B16 or Example B17, the operations further comprising: receiving an artifact transmission including a client artifact and an identifier of a customer apparatus; determining the POP is within the customer apparatus; and performing the change, at least in part based on the client artifact.

Example B19 is the medium of any of Examples B16-B18, the operations further comprising: receiving an update to the vendor data; determining the POP uses the service, at least in part based on the identifier of the POP; and performing the change, at least in part based on the updated vendor data.

Example B20 is the medium of any of Examples B16-B19, the operations further comprising: receiving second policy management information, the second policy management information including an identifier of the service and the identifier of the POP; and performing the change, at least in part based on the identifier of the service and the identifier of the POP.

Example B21 is the medium of any of Examples B15-B20, wherein the first policy management information includes an identifier of an application or a checksum of an application.

We claim:

1. An apparatus, comprising:
a network interface that performs a reception of a launch request to launch an application and receives a policy for a service, wherein the launch request includes an identifier of a workload within a customer infrastructure making the launch request and an identifier of the application; and
a processor configured to determine a customer security posture, at least in part based on the identifier of the workload, activities performed by the workload, and the identifier of the application, and to determine to deny the launch request, at least in part based on the policy and the customer security posture, wherein determining to deny the launch request includes determining whether the workload meets hardening rules and determining whether a checksum of the application matches a predetermined checksum and determining whether a risk score exceeds a predetermined value indicated in the policy, wherein the risk score is based on an evaluation of hardware running a virtual machine (VM) or container that produced the workload within the customer infrastructure.

2. The apparatus of claim 1, wherein the network interface receives an application programming interface (API) request for access to the service, the API request includes the identifier of the workload, and the processor further is configured to deny the access to the service, at least in part based on the policy and the customer security posture.

3. The apparatus of claim 1, wherein the network interface receives an access request for access to a vendor apparatus, the access request includes the identifier of the workload, and the processor further is configured to deny the access to the vendor apparatus, at least in part based on the policy and the customer security posture.

4. The apparatus of claim 1, wherein the network interface transmits a policy request, at least in part based on the reception of the launch request.

5. The apparatus of claim 1, wherein the processor further is configured to detect an event, and the network interface transmits an artifact of the event.

6. The apparatus of claim 1, wherein the network interface transmits policy management information including an identifier of the apparatus.

7. The apparatus of claim 1, wherein the processor further is configured to determine to allow a launch request, at least in part based on the policy and a customer security posture for another workload.

8. A method, comprising:
receiving a launch request to launch an application including an identifier of a workload within a customer infrastructure making the launch request and an identifier of the application;
receiving a policy for a service;

determining a customer security posture, at least in part based on the identifier of the workload, activities performed by the workload, and the identifier of the application; and determining to deny the launch request, at least in part based on the policy and the customer security posture, wherein determining to deny the launch request includes determining whether the workload meets hardening rules and determining whether a checksum of the application matches a predetermined checksum and determining whether a risk score exceeds a predetermined value indicated in the policy, wherein the risk score is based on an evaluation of hardware running a virtual machine (VM) or container that produced the workload within the customer infrastructure.

9. The method of claim 8, further comprising:

receiving an application programming interface (API) request for access to the service, the API request including the identifier of the workload; and denying the access to the service, at least in part based on the policy and the customer security posture.

10. The method of claim 8, further comprising:

receiving an access request for access to a vendor apparatus, the access request including the identifier of the workload; and denying the access to the vendor apparatus, at least in part based on the policy and the customer security posture.

11. The method of claim 8, further comprising:

transmitting a policy request, at least in part based on the receiving the launch request.

12. The method of claim 8, further comprising:

detecting an event; and transmitting an artifact of the event.

13. The method of claim 8, further comprising:

transmitting policy management information including an identifier of an apparatus.

14. The method of claim 8, further comprising:

determining to allow a launch request, at least in part based on the policy and a customer security posture for another workload.

15. A non-transitory, computer-readable medium encoded with executable instructions that, when executed by a processing unit, perform operations comprising:

receiving a launch request to launch an application, wherein the launch request includes an identifier of a workload within a customer infrastructure making the launch request and an identifier of the application;

receiving a policy for a service;

determining a customer security posture, at least in part based on the identifier of the workload, activities performed by the workload, and the identifier of the application; and determining to deny the launch request, at least in part based on the policy and the customer security posture, wherein determining to deny the launch request includes determining whether the workload meets hardening rules and determining whether a checksum of the application matches a predetermined checksum and determining whether a risk score exceeds a predetermined value indicated in the policy, wherein the risk score is based on an evaluation of hardware running a virtual machine (VM) or container that produced the workload within the customer infrastructure exceeds.

16. The medium of claim 15, the operations further comprising:

receiving an application programming interface (API) request for access to the service, the API request including the identifier of the workload; and denying the access to the service, at least in part based on the policy and the customer security posture.

17. The medium of claim 15, the operations further comprising:

receiving an access request for access to a vendor apparatus, the access request including the identifier of the workload; and denying the access to the vendor apparatus, at least in part based on the policy and the customer security posture.

18. The medium of claim 15, the operations further comprising:

transmitting a policy request, at least in part based on the receiving the launch request.

19. The medium of claim 15, the operations further comprising:

detecting an event; and transmitting an artifact of the event.

20. The medium of claim 15, the operations further comprising:

determining to allow a launch request, at least in part based on the policy and a customer security posture for another workload.

\* \* \* \* \*